US010223758B2

(12) United States Patent
Alison et al.

(10) Patent No.: US 10,223,758 B2
(45) Date of Patent: *Mar. 5, 2019

(54) BYPASS LOGIN FOR APPLICATIONS ON MOBILE DEVICES

(71) Applicant: Facebook, Inc., Menlo Park, CA (US)

(72) Inventors: Thomas Alison, Palo Alto, CA (US); Micha Berdichevsky, San Francisco, CA (US); Bosmat Mazal Eldar, Menlo Park, CA (US); Shashank Pandit, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,389

(22) Filed: Jun. 5, 2017

(65) Prior Publication Data
US 2017/0270619 A1 Sep. 21, 2017

Related U.S. Application Data

(63) Continuation of application No. 13/425,165, filed on Mar. 20, 2012, now Pat. No. 9,672,574.

(51) Int. Cl.
G06F 21/00 (2013.01)
G06Q 50/00 (2012.01)
G06F 21/51 (2013.01)
H04W 12/06 (2009.01)
H04W 12/10 (2009.01)
G06Q 10/10 (2012.01)
H04L 29/06 (2006.01)
H04W 4/50 (2018.01)
H04L 29/08 (2006.01)
H04M 1/725 (2006.01)
H04W 4/21 (2018.01)

(52) U.S. Cl.
CPC ............ G06Q 50/01 (2013.01); G06F 21/51 (2013.01); G06Q 10/10 (2013.01); H04L 63/123 (2013.01); H04W 4/50 (2018.02); H04W 12/06 (2013.01); H04W 12/10 (2013.01); H04L 67/34 (2013.01); H04M 1/72525 (2013.01); H04W 4/21 (2018.02)

(58) Field of Classification Search
CPC ........ G06Q 50/01; G06Q 10/10; G06F 21/51; H04L 63/123; H04L 67/34; H04W 4/01; H04W 12/06; H04W 4/206; H04M 1/72525
USPC .......................................................... 726/4
See application file for complete search history.

(56) References Cited

U.S. PATENT DOCUMENTS 6,094,679 A 7/2000 Teng
7,058,180 B2 6/2006 Ferchichi
(Continued)

OTHER PUBLICATIONS

U.S. Appl. No. 13/425,189, filing date Mar. 20, 2012, Alison.

Primary Examiner — Brandon S Hoffman
Assistant Examiner — Nega Woldemariam
(74) Attorney, Agent, or Firm — Baker Botts L.L.P.

(57) ABSTRACT

In one embodiment, a social-networking system authenticates a user of a mobile device, receives a request from the mobile device to install a software application, transmits data to the mobile device comprising the software application and an installation identifier (ID), receives another request including the installation ID from the mobile device to authorize the software application, evaluates the installation ID for validity, and transmits yet another response to the mobile device in accordance with the evaluation.

32 Claims, 4 Drawing Sheets

(56) References Cited

U.S. PATENT DOCUMENTS

| | | |
|---|---|---|
| 7,275,264 B2 | 9/2007 | Cuenod |
| 7,565,325 B2 | 7/2009 | Lenard |
| 8,646,060 B1 | 2/2014 | Ben |
| 8,776,203 B2 | 7/2014 | Ajitomi |
| 8,949,978 B1 | 2/2015 | Lin |
| 9,176,720 B1 | 11/2015 | Day-Richter |
| 2002/0161908 A1 | 10/2002 | Benitez |
| 2005/0038752 A1 | 2/2005 | Gaetano |
| 2006/0005017 A1 | 1/2006 | Black |
| 2006/0112213 A1 | 5/2006 | Suzuoki |
| 2006/0206709 A1 | 9/2006 | Labrou |
| 2006/0253529 A1 | 11/2006 | Kirkup |
| 2007/0130463 A1 | 6/2007 | Law |
| 2008/0141244 A1* | 6/2008 | Kelley ............ G06F 8/61 717/178 |
| 2008/0307035 A1 | 12/2008 | Burckart |
| 2009/0066476 A1 | 3/2009 | Raheman |
| 2009/0092133 A1 | 4/2009 | Mok |
| 2009/0133117 A1 | 5/2009 | Bentley |
| 2009/0164664 A1 | 6/2009 | Buch |
| 2010/0235782 A1 | 9/2010 | Powell |
| 2011/0014900 A1 | 1/2011 | Gottfried |
| 2011/0047597 A1 | 2/2011 | Mahaffey |
| 2011/0069661 A1 | 3/2011 | Waytena |
| 2011/0099621 A1 | 4/2011 | Lizarraga |
| 2011/0153502 A1 | 6/2011 | Jean-Claude |
| 2012/0005224 A1 | 1/2012 | Ahrens |
| 2012/0110317 A1 | 5/2012 | Scheer |
| 2012/0124202 A1 | 5/2012 | Cooper |
| 2012/0143761 A1 | 6/2012 | Doran |
| 2012/0185912 A1 | 7/2012 | Lee |
| 2012/0227087 A1 | 9/2012 | Brown |
| 2012/0278641 A1 | 11/2012 | Papakipos |
| 2012/0284786 A1 | 11/2012 | Somani |
| 2013/0007868 A1 | 1/2013 | Hoggan |
| 2013/0014222 A1* | 1/2013 | Bhatia ............ H04N 21/252 726/4 |
| 2013/0054803 A1 | 2/2013 | Shepard |
| 2013/0061289 A1 | 3/2013 | McFarland |
| 2013/0097238 A1 | 4/2013 | Rogers |
| 2013/0139241 A1 | 5/2013 | Leeder |
| 2013/0198313 A1 | 8/2013 | Hayton |
| 2013/0254849 A1 | 9/2013 | Alison |
| 2014/0081951 A1 | 3/2014 | Greedspan |
| 2015/0200948 A1 | 7/2015 | Cairns |
| 2015/0373009 A1 | 12/2015 | Alison |
| 2016/0249220 A1 | 8/2016 | Vaswani |

* cited by examiner

BYPASS LOGIN FOR APPLICATIONS ON MOBILE DEVICES

RELATED APPLICATIONS

This application is a continuation under 35 U.S.C. § 120 of U.S. patent application Ser. No. 13/425,165, filed 20 Mar. 2012, which is incorporated herein by reference.

TECHNICAL FIELD

This disclosure generally relates to social-networking systems.

BACKGROUND

A social-networking system, such as a social-networking website, enables its users to interact with it and with each other through the system. The social-networking system may create and store a record, often referred to as a user profile, in connection with the user. The user profile may include a user's demographic information, communication channel information, and personal interests. The social-networking system may also create and store a record of a user's relationship with other users in the social-networking system (e.g., social graph), as well as provide services (e.g., wall-posts, photo-sharing, event organization, messaging, games, or advertisements) to facilitate social interaction between users in the social-networking system. The social-networking system may transmit contents and messages related to its services to a user's client device over a network. The social-networking system may generate a personalized set of content objects to display to the user, such as a newsfeed of aggregated stories of the user's first-degree connections. A user may also install software applications that access their user profile and other data from the social-networking system.

DESCRIPTION OF EXAMPLE EMBODIMENTS

Figure 1:
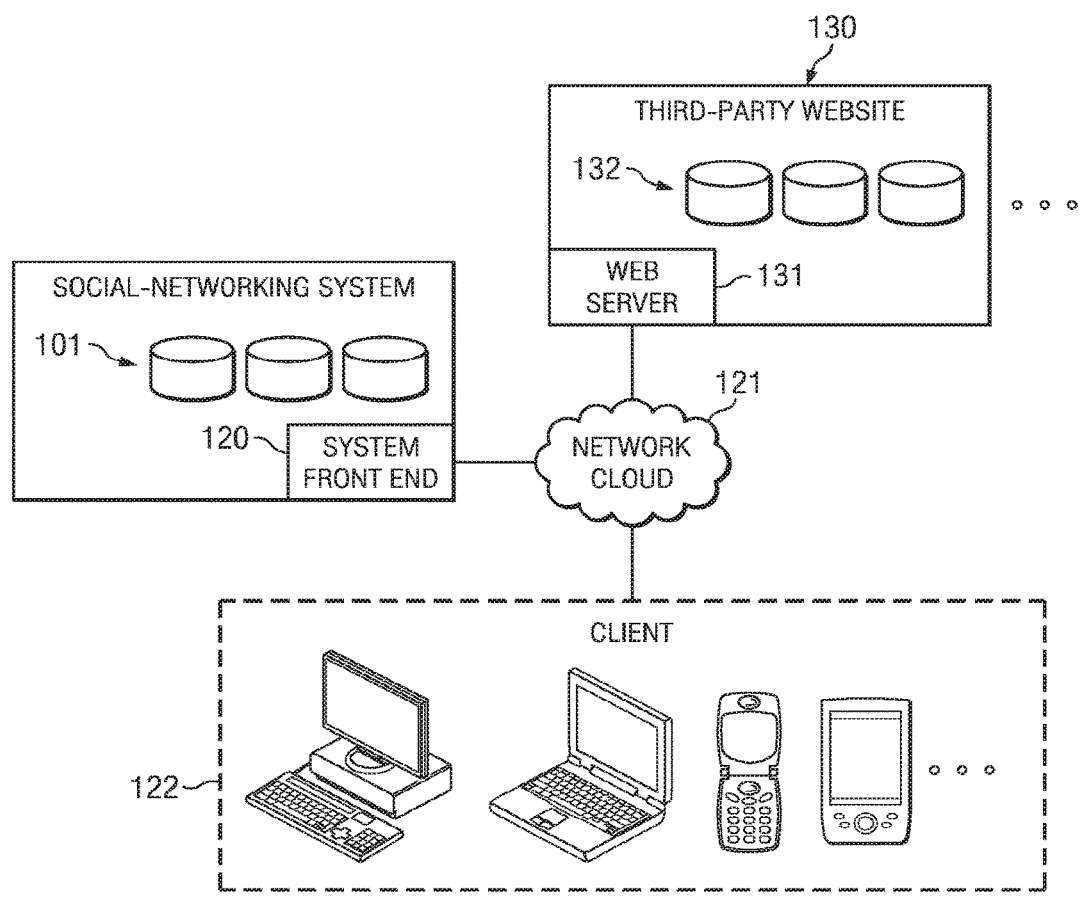
FIG. 1 illustrates an example network environment of an example social-networking system.

In particular embodiments, a social-networking system, such as a social-networking website (e.g., FACEBOOK-.COM), may enable its users to interact with it, and with each other through, the system. In order to access the social-networking system, a user may have to register, sign-up, or create an account on the social-networking system. Thereafter, the user may have to authenticate their identity to subsequently access the social-networking system. In particular embodiments, the social-networking system may use a unique identifier (ID) to authenticate a user. The unique ID may be generated by the social-networking system or created by the user. As an example and not by way of limitation, the unique ID may comprise a login ID, a password, other authentication information, or any combination thereof. As used herein, a "user" may be an individual (e.g., a human user), an entity (e.g., an enterprise, business, or third party application), or a group (e.g., of individuals or entities). Although this disclosure describes authenticating users in a particular manner, this disclosure contemplates authenticating users in any suitable manner.

In particular embodiments, a user of a social-networking system may have a user profile associated with the user. The user profile may be stored by the social-networking system. The user profile may include information provided by the user or information gathered by various systems (such as, for example, the social-networking system or a third-party website) relating to the user, or the user's activities and action. As an example and not by way of limitation, the user may provide his name, profile picture, contact information, birth date, gender, marital status, family status, employment, education background, preferences, interests, and other demographical information to be included in his user profile. The user may identify or bookmark websites or web pages he visits frequently and these websites or web pages may be included in the user's profile. The user may identify other users of the social-networking system that the user considers to be his friends. A list of the user's friends or first-degree contacts may be included in the user's profile. Although this disclosure describes particular user profiles, this disclosure contemplates any suitable user profiles.

In particular embodiments, social-networking system may maintain a social graph. A user of the social-networking system may be represented as a node in the social graph. A relationship between two users (such as, for example, a friendship, a familial relationship, etc.) may be represented as an edge connected the nodes representing the two users. The degree of separation between any two nodes is defined as the minimum number of hops required to traverse the social graph from one node to the other. In particular embodiments, the degree of separation between two users may be considered a measure of relatedness between the two users represented by the nodes in the graph. Although this disclosure describes particular types of social graphs, this disclosure contemplates any suitable types of social graphs.

In particular embodiments, a social-networking system may support a variety of applications, such as, for example, a news feed, media sharing, online calendars, event management, online communications (e.g., email, instant messaging, text, voice or video chat, wall posts, etc.), or other suitable applications. As an example and not by way of limitation, the social-networking system may allow a user to post photographs and other multimedia files to his user profile (e.g., in a wall post or in a photo album) that may be accessible to other users of the social-networking system. Although this disclosure describes a social-networking system with particular types of application, this disclosure contemplates social-networking systems with any suitable types of applications.

FIG. 1 illustrates an example network environment of an example social-networking system. In particular embodiments, a social-networking system may comprise one or more data stores 101. As an example and not by way of limitation, the social-networking system may store user-profile data and social-graph information in data stores 101. In particular embodiments, each data store 101 may comprise one or more storage devices. In particular embodiments, the social-networking system may comprise one or more computing devices (such as, for example, servers) hosting functionality directed to operation of the social-networking system. In particular embodiments, one or more of data stores 101 may be operably connected to the social-networking system's front end 120. As an example and not by way of limitation, front end 120 may be implemented in software programs hosted by one or more computing devices of the social-networking system. A user of the social-networking system may access the social-networking system using a client device 122. In particular embodiments, the system front end 120 may interact with the client device 122 through a network cloud 121. The network cloud 121 may represent a network or collection of networks (such as the Internet, a corporate intranet, a virtual private network, a local area network, a wireless local area network, a cellular network, a wide area network, a metropolitan area network, or a combination of two or more such networks) over which a client devices 122 may access the social networking system. In particular embodiments, a client device 122 may be a computer or computing device including functionality for communicating (e.g., remotely) over a computer network. As an example and not by way of limitation, a client device 122 may be a desktop computer, laptop computer, personal digital assistant (PDA), in- or out-of-car navigation system, smart phone or other cellular or mobile phone, mobile gaming device, another suitable computing device, or two or more such computing devices. In particular embodiments, a client device 122 may execute one or more client applications, such as a web browser (e.g., MICROSOFT WINDOWS INTERNET EXPLORER, MOZILLA FIREFOX, APPLE SAFARI, GOOGLE CHROME, and OPERA, etc.) or special-purpose client application (e.g., FACEBOOK FOR IPHONE, etc.), to access and view content over a computer network. In particular embodiments, the system front end 120 may include web or HTTP server functionality, as well as other functionality, to allow users to access the social-networking system.

In particular embodiments, users of a social-networking system may access other websites or third-party websites (e.g., http://www.espn.com, http://www.youtube.com). As an example and not by way of limitation, a user may use a client device 122 to connect to and communicate with a third-party website 130 through the network cloud 121. The third-party website 130 may comprise a web server 131 operatively connected to one or more data stores 132 storing user data and webpage information. User data may include, for example, user name, user profile picture, and user profile information (e.g., location, affiliation, interest). Webpage information may include, for example, page-layout information, scripts, webpage content such as text (e.g., ASCII or HTML), media data (e.g., graphics, photos, video clips), and executable code objects (e.g., a game executable within a browser window or frame). In particular embodiments, a user may use a web browser or special-purpose client application hosted on the client device 122 to access a third-party website 130 by sending an HTTP request to a web server 131, causing the web server 131 to access the one or more data stores 132 and construct one or more webpages or frames displayed in the web browser or the special-purpose client application.

A social-networking system may communicate with and access a third-party website 130, and vice versa, through a network cloud 121. As an example and not by way of limitation, a webpage constructed by third-party website 130 for a user of a social-networking system may contain information from the social-networking system, such as a frame displaying profile pictures of the user's first-degree friends who are currently active on third-party website 130. As an example and not by way of limitation, a user's user-profile page of a social-networking system may contain an embedded video clip that the user posted on third-party website 130. In particular embodiments, a webpage constructed by a first website may include one or more inline references that cause the client device 122 to access and display content from a second website by incorporating in the webpage's HTML document Uniform Resource Locations (URLs) and/or script code (e.g., JavaScript, PHP, AJAX) that causes a client application hosted on the client device 122 to access the second website to dynamically provide content specified by the script code (e.g., profile pictures). In particular embodiments, a browser cookie installed by a second website on client device 122 may be used to facilitate accessing the second website. As an example and not by way of limitation, requests transmitted to the social-networking system for a particular user may include a browser cookie or other token to enable authentication and access to the social-networking system for the particular user (such as, for example, to access and display profile pictures of the particular user's first-degree friends), without the particular user having to manually enter user identifier (ID) and password information of the social-networking system.

Figure 2:
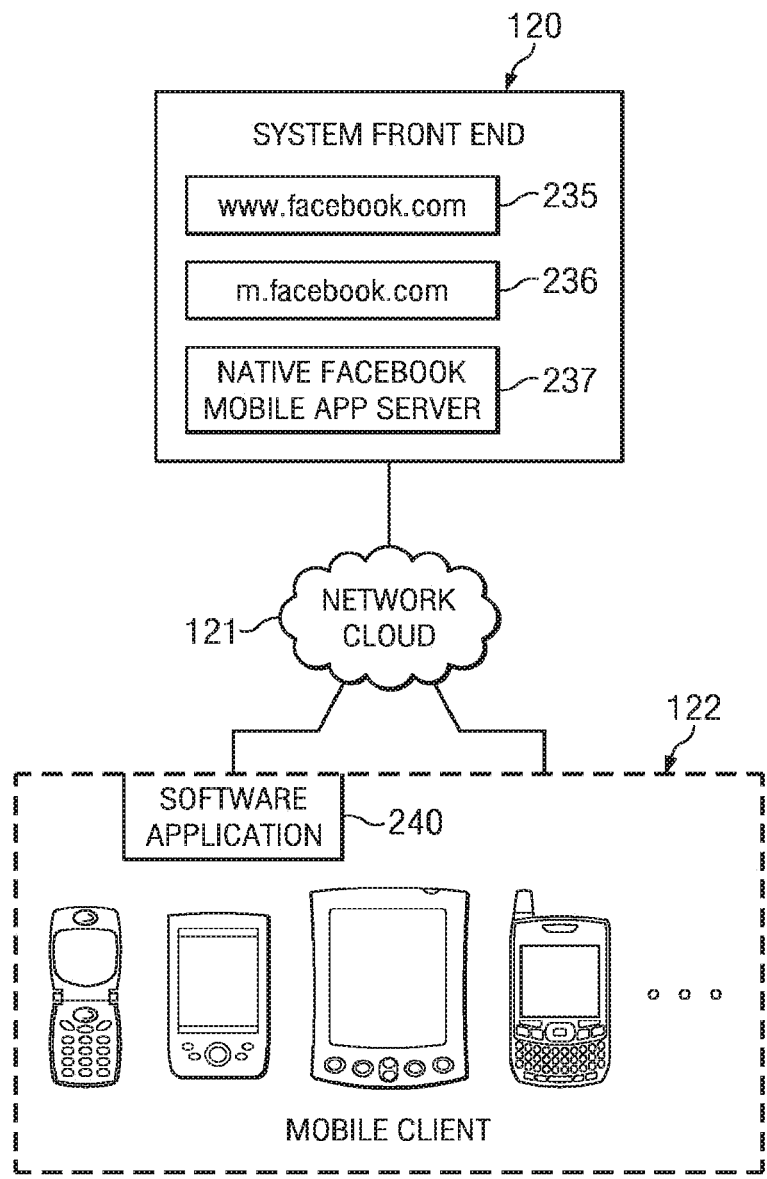
FIG. 2 illustrates an example network environment of a system front end.

FIG. 2 illustrates an example network environment of a system front end 120 of a social-networking system. The system front end 120 may facilitate accessing a social-networking system by a mobile client device 122. In particular embodiments, a user of a mobile client device 122 may choose to access the social-networking system via various channels. As an example and not by way of limitation, the mobile client device 122 may access the standard website 235 associated with the social-networking system (e.g., http://www.facebook.com) using a standard browser client. As another example and not by way of limitation, the mobile client device 122 may access the mobile version of the website 236 associated with the social-networking system (e.g., http://m.facebook.com/) using a mobile browser client (e.g., a lightweight WAP browser, such as OPERA MINI or BLACKBERRY BROWSER). As yet another example and not by way of limitation, the mobile client system 122 may access the a native mobile application server 237 associated with the social-network system (e.g., a native FACEBOOK MOBILE app server) using a native software application (e.g., FACEBOOK FOR IOS, or FACEBOOK FOR ANDROID). The system front end 120 may generate views for the mobile client device 122 based the channel used to access the social-networking system. Although this disclosure describes accessing a social-networking system in a particular manner, this disclosure contemplates accessing a social-networking system in any suitable manner.

In particular embodiments, a mobile client device 122 may utilize one or more software applications 240. The software application 240 may be a native software application resident in the application memory of the mobile client device, or it may be a software application stored remotely (e.g., on a third-party server). The software application 240 may be any suitable computer program for performing any suitable activity. As an example and not by way of limitation, the software application 240 may be an application that facilitates accessing the social-networking system (e.g., FACEBOOK FOR IOS, or FACEBOOK FOR ANDROID). As another example and not by way of limitation, the software application 240 may be an application that accesses data on the social-networking system for other uses (e.g., SPOTIFY, ZYNGA POKER, etc.). In particular embodiments, a social-networking system may receive data from or transmit data to a software application 240 through a network cloud 121. A browser cookie installed on the mobile client device 122 (e.g., by the system front end 120) may be used to facilitate accessing the social-networking system. As an example and not by way of limitation, requests transmitted to the social-networking system from a user of a mobile client device 122 may include a browser cookie or other token to enable authentication and access to the social-networking system for the particular user (such as, for example, to access and display profile pictures of the particular user's first-degree friends), without the particular user having to manually enter a login ID and password information of the social-networking system. In particular embodiments, a software application 240 may receive data from or transmit data to the social-networking system through a network cloud 121. A mobile client device 122 may access a software application 240 by launching the software application from the program memory of the mobile client device 122. The software application 240 may then access the system front end 120, for example, by using an application programming interface (API) protocol. Although this disclosure describes utilizing particular software applications in a particular manner, this disclosure contemplates utilizing any suitable software applications in any suitable manner.

In particular embodiments, a user of a social-networking system may download a software application 240 from a third-party website 130 to a mobile client device 122. As an example and not by way of limitation, the user may access a third-party online "application store," such as, for example, the IPHONE APP STORE, ANDROID MARKET, or another suitable third-party website 130, from a mobile client device 122. The user may then download the software application 240 from the third-party website 130 and install the software application 240 on the mobile client device 122. When the software application 240 is executed, the software application 240 may then access social-networking data on the social-networking system. Social-networking data may include, for example, social graph information, user profiles, or other suitable data stored on the social-networking system. In order to access the social-networking system with the software application 240, the social-networking system may require the user to authenticate his identity, such as, for example by providing his unique ID (e.g., login ID and password). After the social-networking system has authenticated the user's identity, the software application 240 may be authorized to access the social-networking system. Although this disclosure describes downloading particular software applications in a particular manner, this disclosure contemplates downloading any suitable software applications in any suitable manner. Moreover, although this disclosure describes authorizing software applications in a particular manner, this disclosure contemplates authorizing software applications in any suitable manner.

In particular embodiments, a user of a social-networking system may download a software application 240 from the social-networking system to a mobile client device 122. As an example and not by way of limitation, the user may access an application store associated with the social-networking system, such as, for example, http://www.facebook.com/apps, or another suitable website associated with the social-networking system from a mobile client device 122. In order to access the application store associated with the social-networking system, the social-networking system may require the user to authenticate his identity, such as, for example by providing his unique ID (e.g., login ID and password). After the social-networking system has authenticated the user's identity, the user may then access the application store associated with the social-networking system to download a software application 240 from the application store to the mobile client device 122. When transmitting the software application 240, the social-networking system may also transmit an installation identifier (ID) that may be used to indicate that the user of that mobile client device 122 has been authenticated, such that the user may not have to authenticate when the user later executes the software application. When the software application 240 is executed, the software application 240 may access social-networking data on the social-networking system. In order to access the social-networking system with the software application 240, the social-networking system may require the user to authenticate his identity, such as, for example by providing his unique ID (e.g., login ID and password). In particular embodiments, to access the social-networking system with the software application 240, the mobile client device 122 may authenticate the user by transmitting the installation ID to the social-networking system. The social-networking system may then evaluate the installation ID to determine if it is valid, and, if it is valid, may authorize the software application 240 to access the social-networking system without the user having to provide his unique ID, thus bypassing login process. Although this disclosure describes downloading particular software applications in a particular manner, this disclosure contemplates downloading any suitable software applications in any suitable manner. Moreover, although this disclosure describes authorizing software applications in a particular manner, this disclosure contemplates authorizing software applications in any suitable manner.

In particular embodiments, a social-networking system may authenticate a user of a mobile client device 122. The user may be associated with the social-networking system. As an example and not by way of limitation, a login ID and a password to authenticate a user. As another example and not by way of limitation, the social-networking system may access a browser cookie or other token installed by the social-networking system on the mobile client device 122 that indicates that the user is authenticated. Although this disclosure describes authenticating a user in a particular manner, this disclosure contemplates authenticating a user in any suitable manner.

In particular embodiments, a social-networking system may receive a request from a mobile client device 122 to install a software application 240 on the mobile client device 122. After accessing an application store associated with the social-networking system, the user may select one or more software applications 240 that they wish to install to a mobile client device 122. This selection may be transmitted as a request to the social-networking system. As an example and not by way of limitation, a user may access http://www.facebook.com/apps using a mobile client device 122, where the user may view a webpage listing one or more software applications 240 that are available for installation. The user may then select a software application 240 to install, for example, by clicking on an icon associated with the software application 240. This may take the user to a new webpage where the software application 240 may be installed, or it may immediately install the software application 240 to the mobile client device 122. In particular embodiments, the social-networking system may generate a session (such as, for example, an API session) in response to the first request. This session may be stored, and may be used to record the request and any data transmitted in response to the request. Although this disclosure describes receiving particular requests from a mobile client device 122, this disclosure contemplates receiving any suitable requests from a mobile client device 122.

In particular embodiments, a social-networking system may transmit data to a mobile client device 122 comprising a software application 240 and a first installation identifier (ID). The mobile client device 122 may store the software application 240 and the first installation ID, for example, in a data store on the mobile client device 122. The first installation ID may be used to indicate that the user of the mobile client device 122 has already been authenticated by the social-networking system, for example, when a software application 240 on the mobile client device 122 attempts to access the social-networking system. The first installation ID may be generated in any suitable manner, such as, for example, by using a random number generator, a hash function, a private/public key system, another suitable manner, or any combination thereof. In particular embodiments, the transmitted software application 240 may be installation files for a particular software application. The installation files may be executed to install the particular software application or to download further data for installing the particular software application on the mobile client device 122. In particular embodiments, the transmitted software application 240 may be files for accessing a computer program via the network cloud 121. That is, the software application 240 may only be a front-end application for accessing a particular computer program. In particular embodiments, the transmitted software application 240 may be data that allows the mobile client device 122 to access a web-based computer program, such as, for example, via a suitable browser client. In particular embodiments, the first installation ID may include a timestamp. As an example and not by way of limitation, the timestamp on the first installation ID may be based on the time when the social-networking received a request from the mobile client device 122 to install the software application 240. As another example and not by way of limitation, the timestamp on the first installation ID may be based on the time when first installation ID was transmitted to the mobile client device 122. In particular embodiments, the first installation ID may be encrypted. In particular embodiments, the first installation ID may be stored in a session (such as, for example, an API session), where it can be accessed later by the social-networking system. Although this disclosure describes transmitting particular data to a mobile client device 122, this disclosure contemplates transmitting any suitable data to a mobile client device 122. Moreover, although this disclosure describes transmitting particular software applications, this disclosure contemplates transmitting any suitable software applications.

In particular embodiments, a social-networking system may receive a request from a mobile client device 122 to authorize a software application 240. The request may comprise a second installing ID, which may be based on the first installation ID that was previously transmitted with the software application 240 to the mobile device. The second installation ID may comprise information indicating that the user of the mobile client device 122 has been authenticated. As an example and not by way of limitation, when the user of the mobile client device 122 attempts to use the software application 240, the software application 240 may attempt to access the social-networking system. In order to authorize the software application 240 to access the social-networking system, the social-networking system may require the user to authenticate his identity. The mobile client device 122 may attempt to authenticate the user of the mobile client device 122 by transmitting the second installation ID, which may indicate that the user of the mobile client device 122 has already been authenticated by the social-networking system. In particular embodiments, the second installation ID may be encrypted. Although this disclosure describes receiving particular requests from a mobile client device 122, this disclosure contemplates receiving any suitable requests from a mobile client device 122.

In particular embodiments, a social-networking system may evaluate a second installation ID for validity. The second installation ID may be based on a first installation ID that was transmitted to the mobile client device 122 with the software application 240 when the software application 240 was installed on the mobile client device 122. This evaluation may be done in response to receiving a request from the mobile client device 122 to authorize a software application 240, wherein the second installation ID was received with the request. In particular embodiments, the social-networking system may evaluate the second installation ID for validity by determining whether the second installation ID is based on the first installation ID. As an example and not by way of limitation, the mobile client device 122 may have received a first installation ID that was encrypted (for example by using asymmetric key cryptography). The mobile client device 122 may have decrypted the first installation ID and stored the decrypted data on a data store on the mobile client device 122. When the user attempts to authorize the software application 240, the mobile client device 122 may access the installation ID from the data store and encrypt it to generate a second installation ID, which may be transmitted to the social-networking system. Thus, the second installation ID is based on the first installation ID in this case, however the first and second installation IDs are not necessarily identical. The social-networking system may then receive the second installation ID, decrypt it, and evaluate it for validity by confirming that it is based on the first installation ID. In particular embodiments, the social-networking system may evaluate the second installation ID for validity by determining whether the second installation ID substantially matches the first installation ID. As an example and not by way of limitation, the mobile client device 122 may have stored the first installation ID in a data store on the mobile client device 122. When the user attempts to authorize the software application 240, the mobile client device 122 may access the stored first installation ID and transmit the stored first installation ID as the second installation ID. Thus, the first and second installation IDs should be substantially identical in this case. The social-networking system may then evaluate the second installation ID received from the mobile client device 122 to confirm that it is substantially identical to the first installation ID that was previously transmitted when the software application 240 was installed on the mobile client device 122. In particular embodiments, the social-networking system may access the first installation ID from a stored session (such as, for example, an API session) and then evaluate the second installation ID for validity by determining whether the second installation ID is based on the first installation ID from the stored session. In particular embodiments, the social-networking system may evaluate the second installation ID for validity by determining whether the second installation ID has expired. As an example and not by way of limitation, the social-networking system may determine whether a timestamp included with the second installation ID is older than a threshold period of time. If the timestamp is older than the threshold period of time, then the social-networking system may indicate that the second installation ID is not valid. However, if the timestamp is not older than the threshold period of time, then the social-networking system may indicate that the second installation ID is valid. The threshold period of time may be any suitable period of time, such as, for example, 1 second, 1 minute, 1 hour, 24 hours, or another suitable period of time. Although this disclosure describes evaluating particular installation IDs for validity in a particular manner, this disclosure contemplates evaluating any suitable installation IDs for validity in any suitable manner.

In particular embodiments, a social-networking system may transmit a response to a mobile client device 122 in accordance with the evaluation of the validity of the second installation ID. If the second installation ID is evaluated as invalid, then the social-networking system may transmit a response comprising a request to the mobile client device 122 to authenticate the user of the mobile client device 122. As an example and not by way of limitation, if the second installation ID is evaluated as invalid, then the social-networking system may require the user to provide his unique ID (e.g., login ID and password) to authenticate the user. However, if the second installation ID is evaluated as valid, then the social-networking system may transmit a response comprising data authorizing the software application 240. As an example and not by way of limitation, if the second installation ID is evaluated as valid, then the social-networking system may transmit social-networking data to the mobile client device 122 for use by the software application 240. In particular embodiments, the social-networking system may transmit an access token that indicated that the software application 240 is authorized to access the social-networking system. As an example and not by way of limitation, if the second installation ID is evaluated as valid, then the social-networking system may transmit an access token to the mobile client device 122, allowing the software application 240 to access social-networking data on the social-networking system. Although this disclosure describes transmitting particular responses to a mobile client device 122 in accordance with particular evaluations, this disclosure contemplates transmitting any suitable responses to a mobile client device 122 in accordance with any suitable evaluations.

Figure 3:
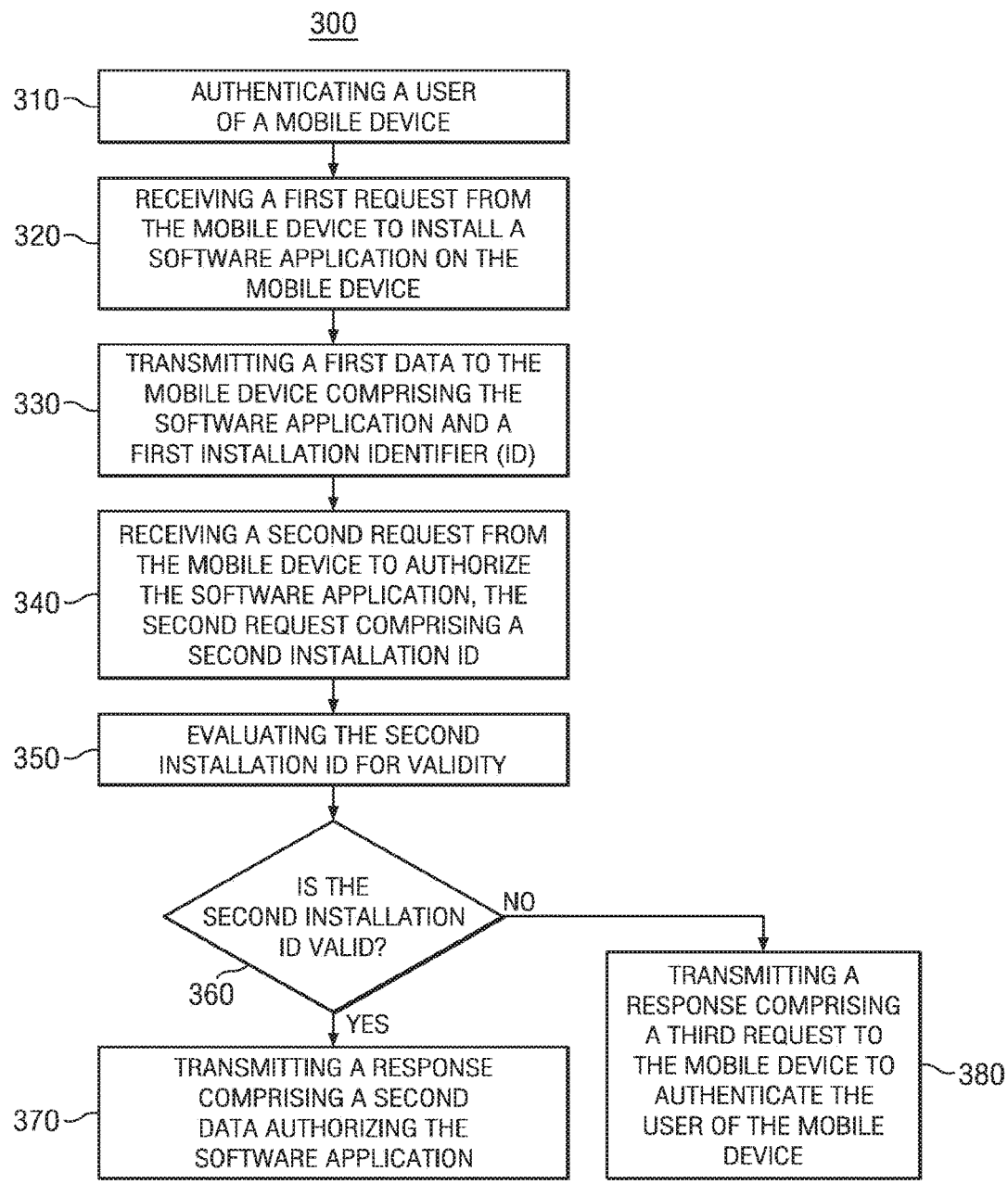
FIG. 3 illustrates an example method.

FIG. 3 illustrates an example method 300 for implementing particular embodiments. The method begins at step 310, where the social-networking system may authenticate a user of a mobile client device 122. At step 320, the social-networking system may receive a first request from the mobile client device 122 to install a software application 240 on the mobile client device 122. At step 330, the social-networking system may transmit a first data to the mobile client device 122 comprising the software application 240 and a first installation ID. The first installation ID may also comprise a timestamp based on the time when the first installation ID was transmitted to the mobile client device 122. At step 340, the social-networking system may receive a second request from the mobile client device 122 to authorize the software application 240. The second request may comprise a second installation ID that is based on the first installation ID. At step 350, the social-networking system may evaluate the second installation ID for validity. At steps 360-380, the social-networking system may transmit a response to the mobile client device 122 in accordance with the evaluation. If the second installation ID is valid at step 360, then the social-networking system may transmit a response comprising a second data authorizing the software application 240 at step 370. However, if the second installation ID is not valid at step 360, then the social-networking system may transmit a response comprising a third request to the mobile client device 122 to authenticate the user of the mobile client device 122 at step 380. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
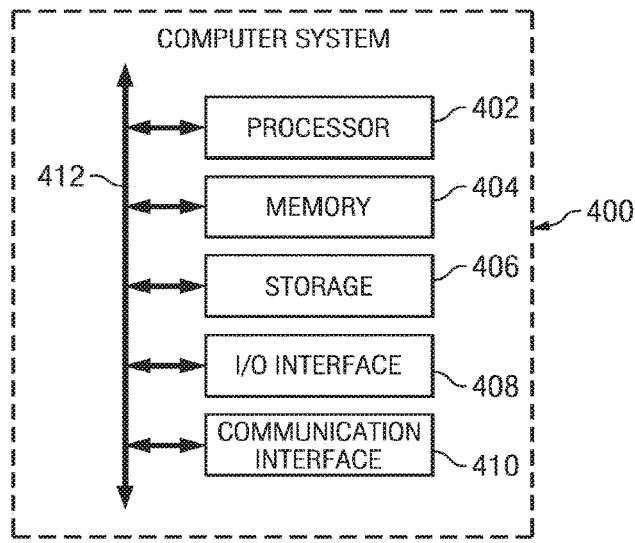
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 5:
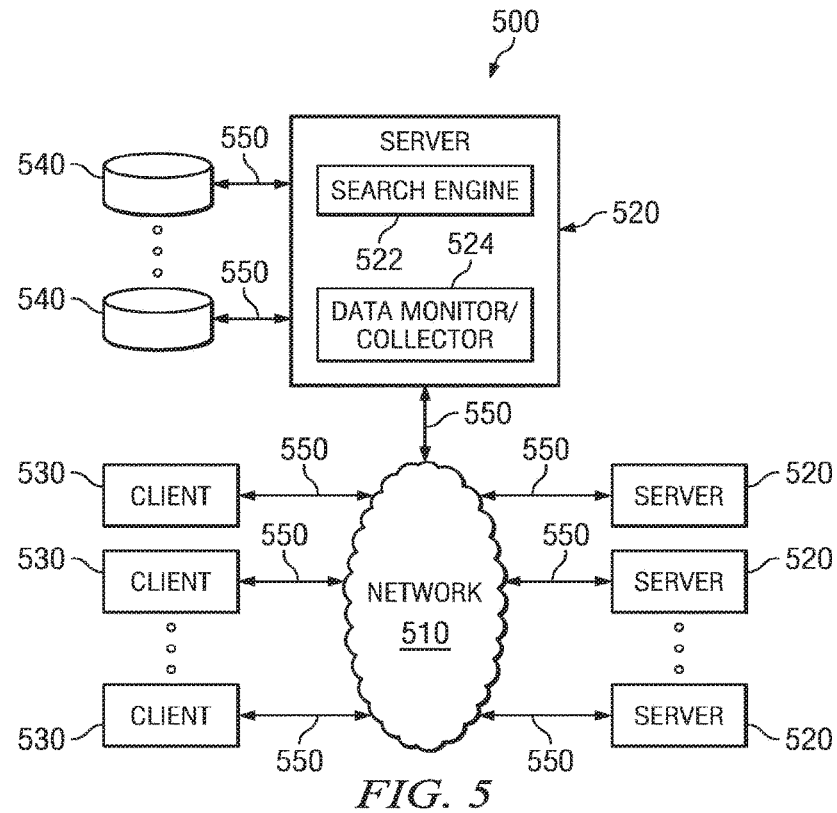
FIG. 5 illustrates an example network environment.

FIG. 5 illustrates an example network environment 500. This disclosure contemplates any suitable network environment 500. As an example and not by way of limitation, although this disclosure describes and illustrates a network environment 500 that implements a client-server model, this disclosure contemplates one or more portions of a network environment 500 being peer-to-peer, where appropriate. Particular embodiments may operate in whole or in part in one or more network environments 500. In particular embodiments, one or more elements of network environment 500 provide functionality described or illustrated herein. Particular embodiments include one or more portions of network environment 500. Network environment 500 includes a network 510 coupling one or more servers 520 and one or more clients 530 to each other. This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 couple servers 520 and clients 530 to network 510 or to each other. This disclosure contemplates any suitable links 550. As an example and not by way of limitation, one or more links 550 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 550. In particular embodiments, one or more links 550 each includes an intranet, an extranet, a VPN, a LAN, a WLAN, a WAN, a MAN, a communications network, a satellite network, a portion of the Internet, or another link 550 or a combination of two or more such links 550. Links 550 need not necessarily be the same throughout network environment 500. One or more first links 550 may differ in one or more respects from one or more second links 550.

This disclosure contemplates any suitable servers 520. As an example and not by way of limitation, one or more servers 520 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 520 includes hardware, software, or both for providing the functionality of server 520. As an example and not by way of limitation, a server 520 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 530, the web server may communicate one or more such files to client 530. As another example, a server 520 that operates as a mail server may be capable of providing e-mail services to one or more clients 530. As another example, a server 520 that operates as a database server may be capable of providing an interface for interacting with one or more data stores (such as, for example, data stores 540 described below). Where appropriate, a server 520 may include one or more servers 520; be unitary or distributed; span multiple locations; span multiple machines; span multiple datacenters; or reside in a cloud, which may include one or more cloud components in one or more networks.

In particular embodiments, one or more links 550 may couple a server 520 to one or more data stores 540. A data store 540 may store any suitable information, and the contents of a data store 540 may be organized in any suitable manner. As an example and not by way or limitation, the contents of a data store 540 may be stored as a dimensional, flat, hierarchical, network, object-oriented, relational, XML, or other suitable database or a combination or two or more of these. A data store 540 (or a server 520 coupled to it) may include a database-management system or other hardware or software for managing the contents of data store 540. The database-management system may perform read and write operations, delete or erase data, perform data deduplication, query or search the contents of data store 540, or provide other access to data store 540.

In particular embodiments, one or more servers 520 may each include one or more search engines 522. A search engine 522 may include hardware, software, or both for providing the functionality of search engine 522. As an example and not by way of limitation, a search engine 522 may implement one or more search algorithms to identify network resources in response to search queries received at search engine 522, one or more ranking algorithms to rank identified network resources, or one or more summarization algorithms to summarize identified network resources. In particular embodiments, a ranking algorithm implemented by a search engine 522 may use a machine-learned ranking formula, which the ranking algorithm may obtain automatically from a set of training data constructed from pairs of search queries and selected Uniform Resource Locators (URLs), where appropriate.

In particular embodiments, one or more servers 520 may each include one or more data monitors/collectors 524. A data monitor/collection 524 may include hardware, software, or both for providing the functionality of data collector/collector 524. As an example and not by way of limitation, a data monitor/collector 524 at a server 520 may monitor and collect network-traffic data at server 520 and store the network-traffic data in one or more data stores 540. In particular embodiments, server 520 or another device may extract pairs of search queries and selected URLs from the network-traffic data, where appropriate.

This disclosure contemplates any suitable clients 530. A client 530 may enable a user at client 530 to access or otherwise communicate with network 510, servers 520, or other clients 530. As an example and not by way of limitation, a client 530 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 530 may be an electronic device including hardware, software, or both for providing the functionality of client 530. As an example and not by way of limitation, a client 530 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 530 may include one or more clients 530; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client device of a user:
   sending, from the client device to a system of an online social network, a unique identifier (ID) associated with the user;
   downloading, to the client device from the system after the system authenticates the unique ID associated with the user, a software application and an installation ID, the software application being operable to access social-networking data associated with the user from the online social network, wherein the installation ID is an indication that the user has been authenticated to the online social network;
   sending, from the client device to the system after downloading the software application and the installation ID, a request for authorization to access the social-networking data via the software application, wherein the request comprises the installation ID;
   receiving, at the client device from the system, a response to the request, wherein the response comprises an authorization from the online social network to access the social-networking data based on an evaluation of the installation ID; and
   executing, by the client device, the software application to access the social-networking data responsive to receiving the authorization from the online social network.

2. The method of claim 1, further comprising, prior to the request for authorization to access the social-networking data,
    sending, from the client device to the system, a first request for authorization to install the software application to the client device, the initial request comprising the installation ID.

3. The method of claim 2, further comprising, wherein when the installation ID is determined to be invalid,
    receiving, at the client device from the system, a second request to authenticate the user of the client device prior to receiving the response from the system comprising the authorization to access the social-networking data via the software application.

4. The method of claim 3, further comprising, in response to the second request,
    sending, from the client device to the system, the unique ID associated with the user.

5. The method of claim 2, wherein when the installation ID is determined to be valid,
    receiving, at the client device from the system, the response comprising the authorization from the online social network,
    wherein the response comprises an access token that indicates the software application has been authorized by the online social network to access the social-networking data.

6. The method of claim 1, wherein the installation ID comprises a timestamp.

7. The method of claim 6, wherein the timestamp is based on:
    a time when the client device sent the unique ID associated with the user to the system, or
    a time when the software application was downloaded by the client device.

8. The method of claim 7, further comprising, when it is determined that the timestamp is older than a threshold period of time,
    receiving, at the client device from the system, a request to authenticate the user of the client device prior to receiving the response from the system comprising the authorization to access the social-networking data via the software application.

9. The method of claim 8, wherein the threshold period of time is 24 hours.

10. The method of claim 1, wherein the user is associated with the online social network.

11. The method of claim 1, wherein the installation ID is encrypted.

12. The method of claim 11, wherein the installation ID is encrypted using asymmetric key cryptography.

13. The method of claim 11, further comprising:
    decrypting the installation ID after downloading, to the client device from the system, the software application and the installation ID; and
    storing the decrypted installation ID on the client device.

14. The method of claim 13, further comprising, prior to sending, from the client device to the system, the request for authorization to access the social-networking data via the software application,
    encrypting the installation ID to form a second installation ID, and
    sending the encrypted second installation ID with the request,
    wherein the encrypted second installation ID is different from the encrypted installation ID.

15. The method of claim 1, wherein the software application comprises one or more data files that allow the client device to access a computer application via a network cloud associated with the online social network.

16. The method of claim 1, wherein the software application comprises data that allows the client device to access a web-based computer application via a browser application associated with the online social network.

17. A client device comprising: one or more processors; and a memory coupled to the processors comprising instructions executable by the processors, the processors operable when executing the instructions to:
    send, from the client device to a system of an online social network, a unique identifier (ID) associated with the user;
    download, to the client device from the system after the system authenticates the unique ID associated with the user, a software application and an installation ID, the software application being operable to access social-networking data associated with the user from the online social network, wherein the installation ID is an indication that the user has been authenticated to the online social network;
    send, from the client device to the system after downloading the software application and the installation ID, a request for authorization to access the social-networking data via the software application, wherein the request comprises the installation ID;
    receive, at the client device from the system, a response to the request, wherein the response comprises an authorization from the online social network to access the social-networking data based on an evaluation of the installation ID; and
    execute, by the client device, the software application to access the social-networking data responsive to receiving the authorization from the online social network.

18. One or more computer-readable non-transitory storage media embodying software that is operable when executed by a client device to:
    send, from the client device to a system of an online social network, a unique identifier (ID) associated with the user;
    download, to the client device from the system after the system authenticates the unique ID associated with the user, a software application and an installation ID, the software application being operable to access social-networking data associated with the user from the online social network, wherein the installation ID is an indication that the user has been authenticated to the online social network;
    send, from the client device to the system after downloading the software application and the installation ID, a request for authorization to access the social-networking data via the software application, wherein the request comprises the installation ID;
    receive, at the client device from the system, a response to the request, wherein the response comprises an authorization from the online social network to access the social-networking data based on an evaluation of the installation ID; and
    execute, by the client device, the software application to access the social-networking data responsive to receiving the authorization from the online social network.

19. The client device of claim 17, wherein the memory further comprises instructions when executed, prior to the request for authorization to access the social-networking data, to send, from the client device to the system, a first request for authorization to install the software application to the client device, the initial request comprising the installation ID.

20. The client device of claim 19, wherein the memory further comprises instructions when executed, when the installation ID is determined to be invalid, to receive, at the client device from the system, a second request to authenticate the user of the client device prior to reception of the response from the system comprising the authorization to access the social-networking data via the software application.

21. The client device of claim 20, wherein the memory further comprises instructions when executed, in response to the second request, to send, from the client device to the system, the unique ID associated with the user.

22. The client device of claim 19, wherein the memory further comprises instructions when executed to, when the installation ID is determined to be valid,
receive, at the client device from the system, the response comprising the authorization from the online social network,
wherein the response comprises an access token that indicates the software application has been authorized by the online social network to access the social-networking data.

23. The client device of claim 17, wherein the installation ID comprises a timestamp.

24. The client device of claim 23, wherein the timestamp is based on:
a time when the client device sent the unique ID associated with the user to the system, or
a time when the software application was downloaded by the client device.

25. The client device of claim 24, wherein the memory further comprises instructions when executed to, when it is determined that the timestamp is older than a threshold period of time, receive, at the client device form the system, a request to authenticate the user of the client device prior to reception of the response from the system comprising the authorization to access the social-networking data via the software application.

26. The client device of claim 25, wherein the threshold period of time is 24 hours.

27. The client device of claim 17, wherein the user is associated with the online social network.

28. The client device of claim 27, wherein the installation ID is encrypted using asymmetric key cryptography.

29. The client device of claim 27, wherein the memory further comprises instructions when executed to:
decrypt the installation ID after downloading, to the client device from the system, the software application and the installation ID; and
store the decrypted installation ID on the client device.

30. The client device of claim 29, wherein the memory further comprises instructions when executed to, prior to sending from the client device to the system, the request for authorization to access the social-networking data via the software application,
encrypt the installation ID to form a second installation ID, and
send the encrypted second installation ID with the request,
wherein the encrypted second installation ID is different from the encrypted installation ID.

31. The client device of claim 17, wherein the software application comprises one or more data files that allow the client device to access a computer application via a network cloud associated with the online social network.

32. The client device of claim 17, wherein the software application comprises data that allows the client device to access a web-based computer application via a browser application associated with the online social network.

* * * * *